United States Patent [19]

Hamaekers et al.

[11] Patent Number: 4,726,573

[45] Date of Patent: Feb. 23, 1988

[54] MOUNT HAVING HYDRAULIC DAMPING ACTION AND MEMBRANE THEREFOR

[75] Inventors: Arno Hamaekers, Gorxheimertal; Hans-J. Rudolf, Rastede; Arnold Simuttis, Bad Kreuznach, all of Fed. Rep. of Germany

[73] Assignee: Firma Carl Freudenberg, Weinheim/Bergstr, Fed. Rep. of Germany

[21] Appl. No.: 873,191

[22] Filed: Jun. 11, 1986

[30] Foreign Application Priority Data

Jun. 22, 1985 [DE] Fed. Rep. of Germany ....... 3522482

[51] Int. Cl.4 ............................................. F16F 13/00
[52] U.S. Cl. .............................. 267/140.1; 137/512.15;
  137/855; 180/300; 180/902; 248/562; 248/636
[58] Field of Search ............................ 267/8 R, 140.1;
  188/298; 180/300, 902; 248/562, 632, 636;
  137/512.15, 855

[56] References Cited

U.S. PATENT DOCUMENTS

| | | | |
|---|---|---|---|
| 2,688,979 | 9/1954 | Kendrick | 137/512.15 |
| 3,114,579 | 12/1963 | Isenberger | 137/855 X |
| 3,314,600 | 4/1967 | Hadley | 137/855 X |
| 4,159,091 | 6/1979 | LeSalver et al. | 267/8 R X |

FOREIGN PATENT DOCUMENTS

| | | | |
|---|---|---|---|
| 27751 | 4/1981 | European Pat. Off. | 267/140.1 |
| 98330 | 1/1984 | European Pat. Off. | 267/140.1 |
| 147855 | 4/1902 | Fed. Rep. of Germany | 137/855 |
| 28361 | 3/1981 | Japan | 137/512.15 |
| 2132311 | 7/1984 | United Kingdom | 267/140.1 |
| 2158182 | 11/1985 | United Kingdom | 267/8 R |

*Primary Examiner*—George E. A. Halvosa
*Attorney, Agent, or Firm*—Felfe & Lynch

[57] ABSTRACT

A membrane for a mount having hydraulic damping action has a peripheral bead and opposite surfaces extending inwardly therefrom. A nonrectilinear cut through the opposite surfaces of the membrane from at least proximate the bead of the membrane delimits at least one tongue from the membrane which projects either centrally of the membrane or toward a thinner portion of the membrane. The mount for the membrane has working and equalizing spaces filled with an hydraulic fluid and arranged to vary in volume in response to relative movement between pedestal and mounting bracket portions of the mount. A throttle opening between the working and equalizing spaces throttles fluid flow therebetween in response to the pressure differential therebetween from the volume variation for hydraulic damping. Annular projections on the mounting bracket hold the membrane in the mount by its peripheral bead so that the membrane separates the working and equalizing spaces and bulges in response to the pressure differentials therebetween.

17 Claims, 12 Drawing Figures

MOUNT HAVING HYDRAULIC DAMPING ACTION AND MEMBRANE THEREFOR

BACKGROUND OF THE INVENTION

The invention relates to a mount having hydraulic damping action and, more particularly, a mount for mounting an engine on the chassis of a vehicle and a membrane therefor.

A known mount has a pedestal and a mounting bracket with an annular spring element therebetween. These enclose variable-volume working and equalizing spaces. The working and equalizing spaces are filled with an hydraulic fluid and communicate through a throttle opening for hydraulically damping relative movement of the pedestal and mounting bracket which varies the volume of the working space to produce a pressure differential between the spaces for hydraulic fluid flow through the throttle opening therebetween. A membrane separates the working and equalizing spaces by securing the periphery of the membrane to the mounting bracket. The pressure differential between the working and equalizing spaces thus bulges the membrane in the direction of the working or equalizing space having the lower pressure. A portion of the membrane is cut through nonrectilinearly to open to form a pressure-relief channel between the working and equalizing spaces, in addition to the throttle opening, when a sufficient pressure differential bulges the membrane sufficiently.

An engine mount of this type is described in published German patent application No. 32 25 701. Its membrane is disposed between symmetrically-positioned grid plates which are rigidly attached to the mounting bracket and bear with some initial tension on either side of the membrane. Its nonrectilinear, membrane cuts intersect the openings in the grid plates, the nonlinearity of the cuts being very slight. It damps well moderately-large-amplitude, low-frequency (below about 30 Hz) vibrations produced, for example, as a vehicle with the engine mount travels over rough ground. It has, however, the drawbacks in operation of being inherently noisy and undesirably transmitting to the chassis of the vehicle both high-frequency (over about 30 Hz) vibrations and larger-amplitude, low-frequency (below about 30 Hz) shaking produced, for example, when the engine is turned on and off. Vibrations and shaking of this kind are not well isolated.

Damping and isolating vibrations usually require measures which functionally interfere with each other. As usual, this is the case with the engine mount referred to above. The damping action, desirable for the vibrations of traveling over rough ground, is obtained at the expense of good isolating action, desirable for the shaking motion which occurs when turning the engine on and off. The engine mount referred to above thus represents merely a more or less unsatisfactory compromise.

U.K. Pat. No. 811,748 describes a similar mount design. Its membrane between the working and equalizing spaces has a calibrated opening instead of a cut. The membrane is clamped in proximity to its outer periphery between flanges which are rigidly united with the mounting bracket. The mount is, nevertheless, afflicted with the same drawbacks as the one mentioned earlier.

SUMMARY OF THE INVENTION

It is, therefore, an object of the invention to improve a mount of the type described above and its membrane in such a way that, when used as an engine mount in a vehicle, for example, the vibrations caused by the vehicle's passing over rough ground are effectively damped and that both high-frequency engine vibrations and the shaking motion occurring as the engine is, turned on and off are isolated in a substantially improved manner, all without generating disturbing noise.

This and other objects are achieved in accordance with the invention in that an elastic membrane separating variable-volume working and equalizing spaces filled with hydraulic fluid in a mount has a peripheral, integral bead which is held between projections of a mounting bracket of the mount. At least one, nonrectilinear cut through the membrane between opposite surfaces thereof extending inwardly from its bead delimits therefrom at least one tongue which is cut-contiguous with the membrane when the membrane is not bulged. The tongue projects from at least proximate the bead and, thus, the projections holding it, where the membrane experiences minimum elongation when it bulges in the direction of the working or equalizing spaces in response to a pressure differential therebetween, centrally of the membrane or toward the thinnest portion of the membrane in the direction between its opposite surfaces extending inwardly from its bead, where the membrane experiences maximum elongation when it bulges. Membrane-bulging pressure differentials are produced by relative movement of a pedestal connected to the mounting bracket by a spring element and operatively connected to vary the volume of the working space, generally by bounding the working space with the spring element as in the known mount described above.

Because of the tongue, the membrane of the mount of the invention bulges much more readily than the membrane according to the German or UK patent publications described at the outset. This is what, in all probability, accounts for its improved isolating action for small-amplitude, high-frequency (over about 30 Hz) vibrations of relative movement between the pedestal and mounting bracket.

The elasticity of the membrane is such that at least moderately-large-amplitude, low-frequency (below about 30 Hz) vibrations between the pedestal and mounting bracket pronouncedly deform the membrane. For this, when the membrane is made of a rubber-elastic material, it should be at least 1 mm thick between opposite, generally top and bottom surfaces of the membrane extending inwardly from its bead. Increasing deformation, i.e. bulging, then gives rise to increasing deformation, i.e. bulging, resistance.

The increasing bulging resistance with increasing bulging reduces the bulging accommodation of a pressure differential between the working and equalizing spaces separated by the membrane as the pressure differential and the vibrational amplitude between the pedestal and mounting bracket producing it increases. This increases the volume of liquid passing between the working and equalizing spaces through a throttle opening therebetween.

The result is good damping action which can be utilized readily for such vibrations as caused by a vehicle's traveling over rough ground with the mount for the engine thereof, for example, because the low-frequency and moderately-large amplitude ranges of these vibrations are readily preidentifiable. Damping them optimally then calls for a throttle opening of a certain size.

The pertinent interrelations for determining the certain size of the throttle opening are known from the mounts of the above-referenced patent publications, for example, and are applicable also to the mount in accordance with the invention.

A shaking motion, also of low (below about 30 Hz) frequency but of still-greater amplitude, as occurs when an internal-combustion engine on the mount is turned on and off, for example, similarly, but still-more pronouncedly bulges the membrane in the direction of the working or equalizing space where the resulting pressure is lower. The tongue bulges with the membrane but does not elongate with the membrane as the membrane bulges more pronouncedly because it is delimited from the membrane by the cut. As a result, therefore, a relief channel forms between the tongue and the cut-contiguous portion of the membrane, generally as a gap at the centermost, tip portion of the tongue.

The hydraulic fluid filling the working and equalizing spaces is then able to escape from the higher-pressure space through this relief channel or gap, in addition to the throttle opening. This reduces the pressure differential between the working and equalizing spaces and, thus, the damping of the mount, while increasing its isolation.

If the shaking motion still-further increases the pressure differential, another tongue motion is superimposed on the bulging and membrane elongation forming the relief channel or gap. In this, the tongue flaps out, generally at its tip, from its middle, cut-contiguous position in the direction of the lower-pressure space. This, appropriately, further increases the cross-sectional area of the relief channel or gap, especially when the flapping exceeds the thickness of the thicker of the membrane and tongue at the cut.

The further-increased cross-sectional area of the relief channel or gap is preferably sufficient to stabilize the pressure differential between the working and equalizing spaces at least substantially at the level of the pressure differential at which the cross-sectional area of the relief channel or gap maximizes. This effectively prevents the transmission of appreciable forces to the chassis, which isolates the largest engine shake amplitudes without interfering with damping through the throttle opening and smaller cross-sectional area of the relief channel or gap for lower amplitude, low frequency motions.

Thus, advantageously, this isolating action is not obtained at the expense of the damping action which is desirable when the vehicle travels over rough ground. In that, rough-ground case, the tongue maintains, its middle, cut-contiguous position with the membrane and the bulging of the membrane does not elongate it appreciably. Only the throttle opening is then available for the transfer of liquid between working and equalizing spaces.

Some adjustment of the cross-sectional areas of the relief channel and throttle opening on the basis of vehicle properties (mass, suspension, etc.) may be necessary. A single design in which the maximum cross-sectional area of the relief channel or gap is less than or equal to the cross-sectional area of the throttle opening will suffice for most cases, however.

In an advantageous embodiment, the nonrectilinearity of the cut is such that the tongue starts at the bead and extends centrally of the membrane where the greatest elongation of a uniformly-thick membrane is likely to occur under operating conditions. The enlargement of the relief channel which occurs when the membrane elongates and the tongue flaps out of cut-contiguousness with the membrane at extremely-large bulge amplitudes are thus facilitated.

In an advantageous embodiment, the tongue and membrane are interconnected by the bead. This assures that the tongue will always return to its neutral, cut-contiguous position with the membrane after the overpressure in the working or equalizing space bulging the membrane and flapping the tongue has been relieved. In other embodiments, however, the cut may extend through the bead. This facilitates flapping mobility of the tongue and tongue materials or thicknesses different from the membrane. Precision in the length of the cut is, therefore, important to the operation of the mount.

In still other embodiments, a plurality of cuts delimit a plurality of tongues, preferably distributed uniformly around the circumference of the membrane. This aids uniform and rapid reduction of the pressure differentials between the working and equalizing spaces upon the occurrence of shaking motion and, thus, the isolating action therefrom.

It is advantageous to arrange such a plurality of cuts so that the tongues delimited thereby are symmetrically arranged, diametrically opposite one another in pairs. This facilitates opening the relief channels when a pressure differential bulges the membrane and flaps out the tongues for further improvement in the transition from damping to isolating shaking motion.

The projections of the mounting bracket of the mount holding the bead of the membrane preferably are two annular projections having a convexly rounded profile on their inner sides, facing the membrane to prevent mechanical damage to the membrane or bead as the membrane bulges. Uniform deformability (bulgability) of the membrane will thus be assured, even after long-time use. This is of considerable importance because the relief channel or gap opened by the tongue is supposed to open only when large, shaking-amplitude motion is to be isolated.

To let the membrane bulge readily, the membrane may be so dimensioned in the undeformed state relative to the annular projections of the mounting bracket holding its bead that the bead of the membrane is radially and/or axially spaced from the annular projections, and the membrane, but not its bead, can pass between the projections. With such a design, small pressure differentials between the working and equalizing spaces, such as those from low-amplitude, high-frequency vibrations across the mount, cause the membrane to bulge but do not immediately result in elastic elongation of the membrane as the membrane passes between the annular projections to draw the bead holdingly thereto. These vibrations can therefore be isolated more readily.

Utilization of this characteristic is, therefore, especially advisable for membranes having higher resistance to elongation such as, for example, membranes provided with a reinforcing insert of a rubber-elastic material of reduced extensibility and/or of greater thickness ranging up to 4 mm, for example. Membranes of this type are distinguished by high mechanical strength. Their use is, therefore, particularly recommended where great durability is sought.

The nonrectilinearity of the cut delimiting the tongue from the membrane may be a uniform or nonuniform curve or angled, rectilinear segments. Semicircular cuts are particularly easy to make. For heavy-duty applications, it is advantageous to configure the tongue with an arcuate tip and straight sides outwardly therefrom. Tongues which taper to a pointed tip are also suitable.

The tongue preferably has a length, i.e. depth from tip to outermost, bead-adjacent base, that is greater than the least thickness of the membrane in the direction between the opposite surfaces of the membrane extending inwardly from its bead and, more preferably, greater than double the least thickness of the membrane. The length of the tongue also should be at least equal to the least thickness of the tongue in the same direction and, preferably, twice as thick, but not more than eight times and, preferably, not more than five times the least thickness of the tongue.

The cross section of the cut between the opposite surfaces of the membrane extending inwardly from the bead may deviate from a straight line. If the cross section of the cut is U-shaped and receives the tongue in its U shape, the tongue then flaps out of its middle, U-received, cut-contiguous position only after overcoming the resistance of an overlapping leg of the U. If the cross section of the cut does not have mirror-image symmetry from its center line, the tongue flaps out of its middle, cut-contiguous position at a lower pressure differential between the working and equalizing spaces in one direction than in the other. This accommodates the maximum excursion occurring as an internal-combustion engine is turned on and off particularly well, without impairing the other actions of the mount. If the cross section of the cut describes a curved or oblique path, it is advantageous for it to intersect the opposite surfaces of the membrane extending inwardly from the bead at an angle of from about 45° to about 80°. Over this range, wear at the edges of the cut will be minimal. This is a considerable advantage for long-term constancy of the operating properties.

The change in the damping function of the mount from opening the relief channel or gap through the membrane with the relative, flapping movement of the tongue can be varied by making the membrane and/or the tongue thicker adjacent the cut. Making the tongue thicker results in particularly good sound isolation; making the membrane thicker results in improved damping behavior.

The advantages obtained with the mount of the invention thus include silent operation and improved isolation of low-amplitude, high-frequency vibrations; damping of moderately-large-amplitude (rough road), low-frequency (below about 30 Hz) vibrations; and isolation of large-amplitude (shaking motion occurring as an internal-combustion engine on the mount is turned on and off), low-frequency vibrations. The shaking motion, particularly, then is not as disturbing as it was with prior designs. The complete noiselessness in use and long-term constancy of operating behavior also particularly distinguish the mount.

BRIEF DESCRIPTION OF THE DRAWINGS

Merely-exemplary, preferred embodiments of mounts according to but not limiting the invention will now be described with reference to drawings thereof, wherein.

DESCRIPTION OF THE PREFERRED EMBODIMENTS

Figure 1:
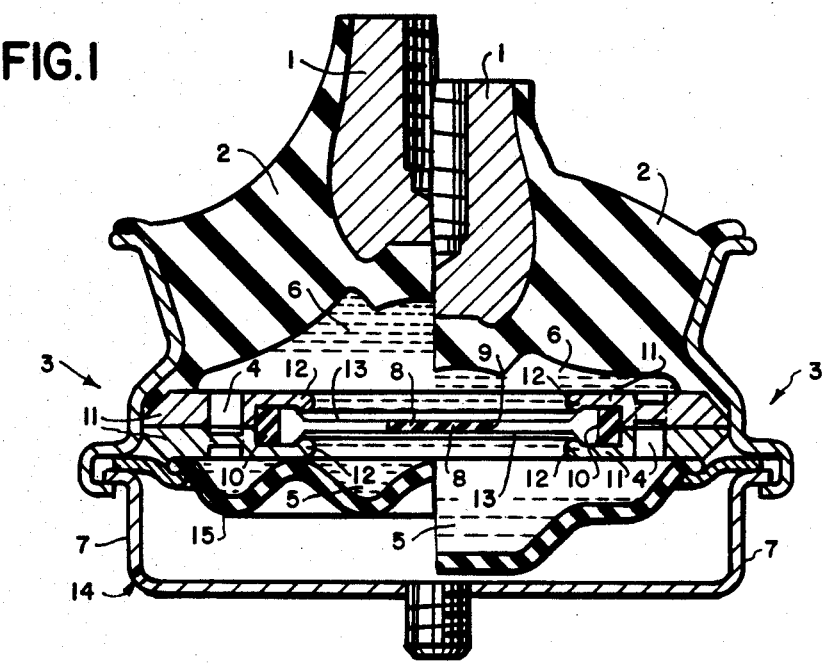
FIG. 1 is a sectional elevation, split to show two operational positions, of one preferred embodiment.

An engine mount is shown in two operational positions in FIG. 1. It has a pedestal 1 and a composite-structure mounting bracket at 3 which are each arranged by threaded structures thereon to be attached to one of the engine and the chassis of a vehicle using the engine. The pedestal and mounting bracket are united by a spring element 2 made of a rubber-elastic material in the shape of a hollow cone converging toward the pedestal. The spring element bears the static load of the engine and resiliently accommodates vibrations between the engine and the chassis in operation.

The mounting bracket at 3 has two annular, metal-plate projections 11 fixed thereto. The inner periphery of the annular projections define a channel for receiving a peripheral bead 10 of a membrane 8 between the projections and holding the bead with innermost, inwardly-convex beads 12 at the opposite, top and bottom surfaces of the membrane extending inwardly from its bead. The bead 10 of the membrane is received by the projections 11 of the mounting bracket and held by their beads 12 without initial pressure.

Throttle openings 4 (two shown) penetrate the annular projections 11 to connect a working space 6 and an equalizing space 5. The working space is defined by the spring element 2, the annular projections 11, and the membrane 8. Movement of the pedestal 1 and spring element 2 relative to the mounting bracket at 3 thus varies the volume of the working space 6. The equalizing space is defined by a rolling diaphragm 15 sealingly held in the mounting bracket at 3 by a compound base plate structure 7 which is vented at 14 to accommodate variation in the volume of the equalizing space 5 by rolling out the diaphragm 15 in response to the pressure of the hydraulic fluid therein, the annular projections 11, and the membrane 8. The spaces 5, 6 are, therefore, separated, in part, by the membrane. Both spaces 5, 6 are filled with an hydraulic fluid, preferably water containing antifreeze.

Figure 2:
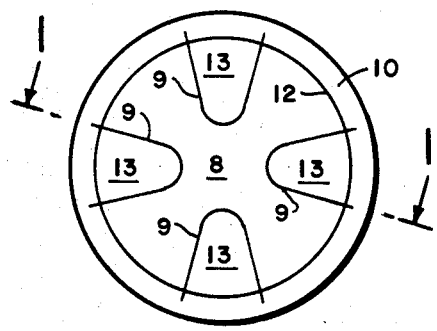
FIG. 2 is a reduced-size plan view of a membrane of the embodiment of FIG. 1.

The membrane 8 is circular as shown in FIG. 2. It is made of a rubber-elastic material having a Shore A hardness of from about 40 to about 90. Its peripheral bead 10 is integral and has a thickness in the direction between the opposite surfaces of the membrane extending inwardly from the bead 10 (vertically as shown in FIG. 1) of about 6.9 mm. The central region of the membrane 8 between the opposite surfaces extending inwardly from the bead 10 is substantially thinner and, thus, readily capable of bulging in response to a pressure differential between the working space 6 and the equalizing space 5 from the introduction of vibrations between the pedestal 1 and mounting bracket at 3, even of high frequency, for example.

As shown in FIG. 2, there are four, symmetrically-arranged U-shaped cuts 9 extending from inward portions of the bead 10 centrally of the membrane, across portions of the opposite surfaces of the membrane 8 extending inwardly from the bead. As shown in FIG. 1, the cuts 9 extend through the membrane to its other, opposite surface to delimit from the membrane tongues 13 capable of flapping out of the normal, cut-contiguous relation to the membrane shown in FIG. 1 in response to a sufficient pressure differential between the working and equalizing spaces 5, 6.

In principle, one such tongue will suffice if it is appropriately dimensioned. However, for durability, it is advantageous to provide a plurality of smaller tongues, as shown in FIG. 2.

FIGS. 3 to 12 show various ways in which the cross section of the cut between the opposite surfaces of the membrane extending inwardly from its bead, the plan of the cut across the portions of the opposite surfaces of the membrane, and the elevation of the membrane and tongue between the opposite surfaces can be modified. Each of these modifications affects the operational bulging of the membrane or flapping of the tongue to affect the damping and isolating operation of the mount.

In each of FIGS. 3 to 10, as in FIGS. 1 and 2, however, the cuts which delimit the tongues from the membrane start and terminate in the bead of the membrane. Each tongue thus spans a portion of the membrane extending from the portion of minimum elongation, i.e. its bead 10 in the projections 11, towards a portion of greater elongation when the membrane bulges. Thus, any bulging of the membrane sufficient to elongate (stretch) it results in a relief channel between the membrane and the tip of the tongue through which the hydraulic fluid can pass. In addition, the tongues are not connected to any portion of the membrane for bulging therewith. This maximizes the mobility of the tongues for flapping (not shown) from cut-contiguousness (shown) with the membrane to enlarge the cross sectional area of the relief channel.

Figure 3:
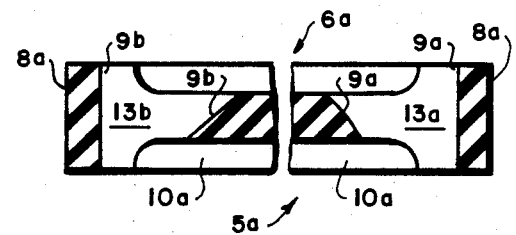
FIG. 3 is a sectional elevation, enlarged for clarity and centrally broken to reduce the resulting size, of another membrane.
Figure 4:
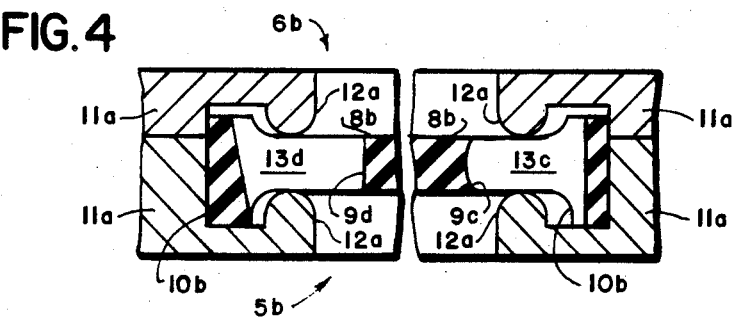
FIG. 4 is a sectional elevation, enlarged for clarity and centrally broken to reduce the resulting size, of another membrane together with a projection portion of a mount therefor.

FIGS. 3 and 4 show embodiments of a membrane for a mount as shown in FIG. 1 in which the cross section of at least one cut delimiting the tongue is not rectilinearly perpendicular to the opposite surfaces of the membrane extending inwardly from its bead.

In the embodiment of FIG. 3, the cross section of a cut 9a between opposite surfaces of a membrane 8a extending inwardly from a peripheral bead 10a of the membrane to delimit a tongue 13a from the membrane for projecting centrally of the membrane is arcuately oblique, and the cross section of another cut 9b, to delimit another tongue 13b, is similarly rectilinearly oblique. The obliqueness of both cuts 9a, 9b is such that the cuts intersect the opposite surfaces of the membrane at internal/external angles of about 45°. As a result, the tongues 9a, 9b overlap the membrane 8a relative to one of the opposite surfaces of the membrane (bottom, as shown) extending inwardly from its bead. Then, when the membrane 8a is in a mount as in FIG. 1, the tongues 13a, 13b can initially bulge with the membrane to isolate small-amplitude, generally high-frequency vibrations and the membrane can then elongate from the centermost, tongue tips to open a relief channel to isolate partially larger-amplitude, generally low-frequency vibrations, as with the embodiment of FIG. 1. When still larger-amplitude, generally low-frequency vibrations produce a still-larger pressure differential between a working space at 6a and an equalizing space at 5a separated by the membrane 8a, however, the operation of the embodiment of FIG. 3 differs from that of FIG. 1 on account of the oblique cross sections of the tongue-delimiting cuts 9a, 9b. With the embodiment of FIG. 3, a pressure differential between the working and equalizing spaces at 5a, 6a from a sufficiently higher pressure in the equalizing space at 5a flaps the tongues 13a, 13b out of the cut contiguousness with the membrane 8a shown in FIG. 3 (the membrane and tongues having first bulged into the working space at 6a, as before described) into the working space at 6a as with the embodiment of FIG. 1, but when an opposite pressure differential would flap the tongues 13a, 13b into the equalizing space at 5a, the tongues must first overcome the resistance of the overlapping membrane. A higher pressure in the working space 6a than in the equalizing space at 5a is therefore required to flap out the tongues 13a, 13b to open the cross section of the relief channel through the membrane thus formed for less damping and more isolation from a mount like that of FIG. 1 with the membrane of FIG. 3.

In the embodiment of FIG. 4, the cross section of one cut 9c is symmetrically U-shaped to intersect the opposite surfaces of the membrane 8b at an angle of from about 40° to about 60° and receive the tongue 13c therein. The other cut 9d is rectilinearly perpendicular to the opposite surfaces of the membrane. A pressure differential in either direction across the membrane, whether higher in an equalizing space at 5b or working space at 6b, sufficient to flap the tongue 13d from cut contiguousness with the then-bulged membrane 8b therefore does not flap out the tongue 13c because of the resistance of the tongue-overlapping portion of the membrane on the higher pressure side of the membrane. The flapped-out tongue 13d then provides a pressure relief channel for some reduction in damping and increase in isolation, but only when low-frequency vibrations of extremely large amplitude occur across a mount with the membrane of FIG. 4, as is typically the case when an internal-combustion engine on the mount is turned on or off, is there sufficient pressure differential to flap out the tongue 13c, too, for fuller isolation, as desired. With a view to assuring the reliability of this action, the membrane preferably is not too thin but has a thickness of from about 2 to about 6 mm. The membrane 8b will then possess long-lasting durability and exhibit a nearly constant operating behavior throughout the service life of a motor vehicle equipped with an engine mount as shown in FIG. 1 with the membrane of FIG. 4.

FIG. 4 also shows that the bead 10b of the membrane is smaller than the channel of the annular projections 11a of a mount like that of FIG. 1 in which it is received but larger than the space between the inward beads 12a on the projections 11a in the direction of the opposite surfaces of the membrane 8b extending inwardly from its bead 10b to be spaced inwardly (vertically, as shown) from the projections and outwardly from the beads 12a of the projections when the membrane 8b is unbulged, as shown. The membrane 8b and its bead are thus free to move in the channel of the projections 11a inwardly from the position shown when the membrane 8b bulges until the membrane 8b bulges enough to draw its bead 10b to the beads 12a of the projections. This facilitates membrane bulging to isolate small-amplitude, generally high-frequency vibrations, as previously described, even though the membrane has the durability-promoting thickness previously indicated and, thus, lower elasticity.

Figure 5:
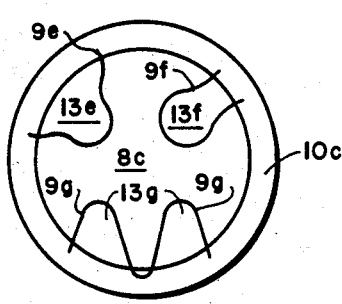
FIG. 5 is a reduced-size plan view of another, composite membrane.

FIG. 5 shows a membrane 8c having nonrectilinear cuts 9e, 9f, 9g extending from the bead 10c of the membrane centrally of the membrane. The cuts 9e and 9f delimit tongues of different shapes, both of which, however, extend radially into the membrane which is the preferred, central projection of the tongues. Cut 9g shows how a single cut can delimit two tongues 13g from the membrane, the tongues then extending only generally centrally of the membrane.

Figure 6:
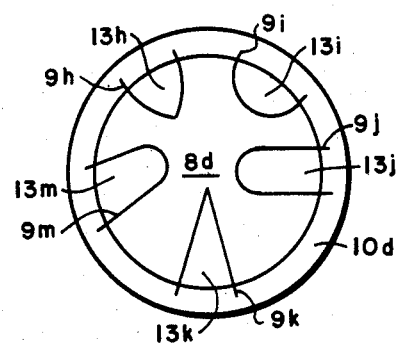
FIG. 6 is a reduced-size plan view of another, composite membrane.

FIG. 6 shows further nonrectilinear cuts 9h, 9i, 9j, 9k, 9m delimiting tongues 13h, 13i, 13j, 13k, 13m of different shapes from a membrane 8d having a bead 10d. As previously indicated, the semicircular cut 9i is particularly easy to form and the parallel sides of the U-shaped cut 9j delimit a tongue which is particularly durable. As with the tongues 13g of FIG. 5, the tongue 13m of FIG. 6, which extends non-radially from the bead 10d, is considered as extending centrally of the membrane 8d, as "centrally" is used herein.

Figure 7:
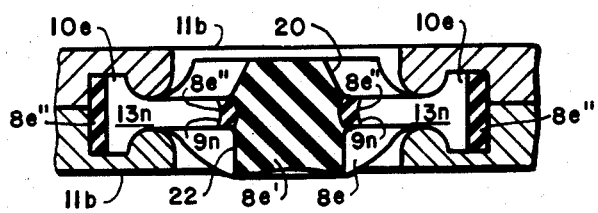
FIG. 7 is a sectional elevation of another membrane together with a projection portion of a mount therefor.
Figure 8:
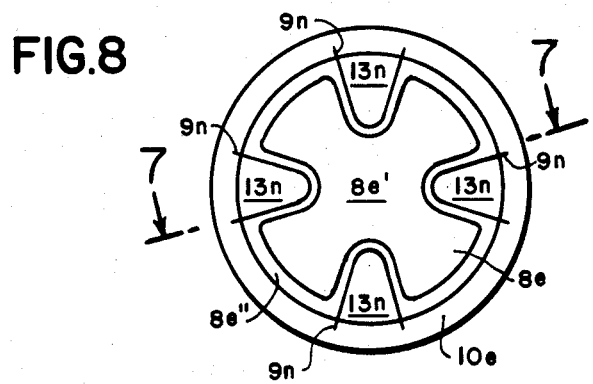
FIG. 8 is a reduced-size, plan view of the membrane of FIG. 7.

FIGS. 7 and 8 show a membrane 8e of two rubber-elastic materials in portions 8e' and 8e" and non-uniform thickness between the opposite surfaces extending inwardly from its bead 10e. The tongues 13n delimited from the membrane by cuts 9n are thinner than than the membrane. Both the different materials and the non-uniform thickness of the membrane affect the bulging operation of the membrane and the flapping of the tongues therein when the membrane is held between projections 11b of a mount as shown in FIG. 1. The thicker, central portions of the membrane do not bulge as readily as a thinner membrane so that the bulging of the membrane is confined primarily to its thinner, more-peripheral portions. The bulging operation of the membrane 8e therefor accommodates the small pressure differentials between working and equalizing spaces of small vibrations but not the larger pressure differentials of larger vibrations to maintain longer the damping of these than a thinner membrane. The different materials of the membrane 8e may augment the same effect by having a stiffer material in the central portion 8e' of the membrane.

The thicker, central portion 8e' of the membrane 8e shown in FIG. 7 also tapers inwardly, away from the tongues 13n on one, upper surface 20 of the membrane extending inwardly from its bead but not on the opposite, lower surface 22. As a result, when the tongues 13n flap upwardly from the cut contiguous position shown in response to a sufficient pressure differential, as before described, relief channels of greater cross section are opened than when the tongues flap open downwardly. The isolation effect of the relief channels formed by flapping the tongues from the cut contiguous position shown thus depends on the direction of the vibration producing the pressure differential which flaps out the tongues.

Figure 9:
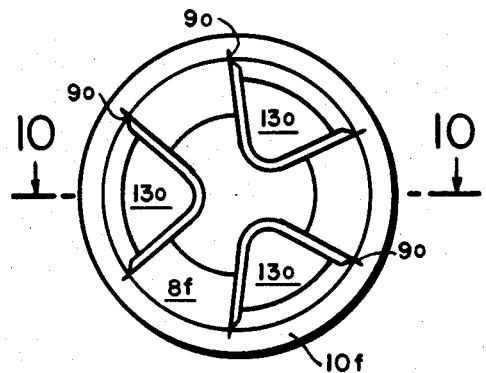
FIG. 9 is a reduced-size, plan view of the membrane of FIG. 10.
Figure 10:
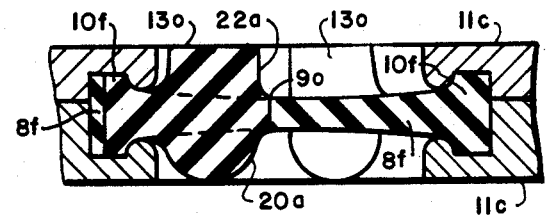
FIG. 10 is a sectional elevation of another membrane together with a projection portion of a mount therefor.

FIGS. 9 and 10 show an embodiment which is similar to that shown in FIGS. 7 and 8, except that it is the tongues 13o which are of a different material and different thickness from the membrane 8f, instead of the other way around as in FIGS. 7 and 8. The operational results are, however, substantially the same. In the embodiment of FIGS. 8 and 9, however, it is an upper surface 22a of each tongue which does not extend away from the cuts 9o. When the tongues 13o flap relative to the membrane 8f, these surfaces tilt towards the membrane to further reduce the cross sectional area of the relief channel opened by the flapping of the tongues from the cut contiguous positions relative to the membrane shown in FIG. 10 in this direction. When the tongues 13o flap out of cut contiguousness with the membrane 8f in the other, upward direction, however, the curvature of the surfaces 20a away from the cuts 9o allows a larger cross section to the relief channels thereby opened. The directional operation of the embodiment shown in FIG. 10 relative to the surfaces 20a, 22a is, therefore, the same as that of the embodiment of FIG. 7 relative to the surfaces 20, 22, but augmented by having the tongue 13o thicker than the membrane 8f, instead of vice versa.

Because the membrane 8f in FIG. 10 is thinner than the membrane 8e in FIG. 7, the membrane of the embodiment of FIG. 10 bulges more readily. This more readily isolates high-frequency, low-amplitude vibrations and damps lower-frequency, larger-amplitude vibrations in a mount as shown in FIG. 1, until the amplitude of the vibrations produces a pressure differential sufficient to flap the tongues 13o from cut contiguousness with the then-bulged membrane 8f, this pressure differential being greater because of the greater thickness of the tongue 13o in FIG. 10 as compared to tongue 13n in FIG. 7. Further, also because the membrane 8f in FIG. 10 is thinner than the membrane 8e in FIG. 7, it also elongates more readily to stretch the membrane away the innermost tips of the tongues. The relief channels thus progressively opened with progressive bulging provides progressive transition to the relief channel opened when the tongue flaps out of cut contiguousness with the membrane for a progressive transition towards the vibration isolation produced thereby.

Figure 11:
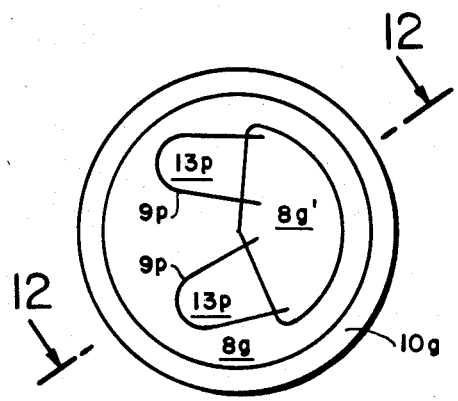
FIG. 11 is a reduced-size, plan view of the membrane of FIG. 12.
Figure 12:
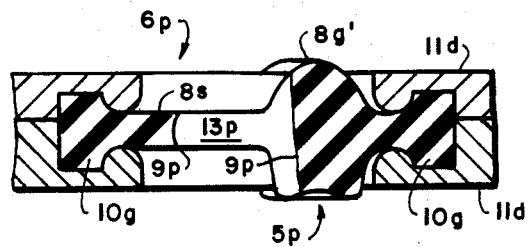
FIG. 12 is a sectional elevation of another membrane together with a projection portion of a mount therefor.

The embodiment of FIGS. 11 and 12 differs from those of all the other FIGS. in that the cuts 9p delimiting the tongues 13p from the membrane 8g do not extending into the bead 10g of the membrane, but only proximately therefrom, and the tongues 13p do not project therefrom centrally of the membrane 8g. Instead, a portion 8g' of the membrane is thicker than the rest of the membrane in the direction between opposite surfaces of the membrane extending inwardly from its bead. The cuts 9p project into the thicker portion 8g' of the membrane to delimit tongues 13p which, therefore, project toward a thinner portion of the membrane.

The operation of the membrane shown in FIGS. 11 and 12 when in a mount as shown in FIG. 1 as indicated by the portions of the projections 11d shown in FIG. 12 is, however, similar to that described for the previously-described embodiments. Small-amplitude, high-frequency vibrations produce corresponding pressure differentials between a working space at 6p and an equalizing space at 5p which bulge the membrane 8g for isolation between a pedestal and mounting bracket (neither shown) of the mount. For this, the thicker portion 8g' of the membrane does not extend to the projections 11d so that the membrane 8g can slightly bulge readily in response to small pressure differentials. Moderately-large-amplitude, low-frequency (rough road) vibrations produce larger pressure differentials which bulge the membrane enough for elongating the membrane. Because the portion of the membrane 8g at the tips of the tongues, remote from the thicker portion 8g' of the membrane, is thinner, it elongates more to open a relief channel at the tip of the tongue in correspondence with the elongation of the membrane and, thus, the amplitude of the vibrations to reduce the damping and increase the isolation of these vibrations progressively with amplitude. Still larger-amplitude, lower-frequency vibrations produce pressure differentials sufficient to flap the tongues 13p out of cut-contiguousness with the then-bulged membrane 8g in the direction of the lower pressure in the working or equalizing space at 5p, 6p. As with the tongue 13c of the embodiment of FIG. 4, the U-shape of the cross section of the cuts 9p between the opposite surfaces of the membrane extending inwardly from its bead permits the tongue to flap out of cut contiguousness in this way only when the pressure differential is sufficient to overcome the resistance of the overlapping portion of the membrane 8g. When the tongue flaps out, however, a relief channel of sufficient cross section is opened to substantially isolate the larger-amplitude, lower-frequency vibrations produced, for example, when an engine on the mount is turned on or off.

It will be understood that the specification and examples are illustrative but not limitative of the present invention and that other embodiments within the spirit and scope of the invention will suggest themselves to those skilled in the art.

What is claimed is:

1. In a mount for hydraulic damping action having a pedestal, a mounting bracket, a spring element connecting the pedestal and mounting bracket, means defining variable-volume working and equalizing spaces for filling with an hydraulic fluid, the means defining the working space being operatively connected to the pedestal for varying the volume of the working space in response to movement of the pedestal relative to the mounting bracket, and the means defining the working and equalizing spaces comprising an elastic membrane separating the working and equalizing spaces for bulging in response to a pressure differential of the hydraulic fluid therein, and at least one throttle opening for throttled flow of the hydraulic fluid between the working and equalizing spaces in response to a pressure differential therebetween, the improvement comprising:

a peripheral, integral bead about the membrane, whereby the membrane has opposite surfaces extending inwardly from its bead, said bead having a thickness which is greater than the thickness of said membrane between said opposite surfaces next adjacent thereto;

projections from the mounting bracket for holding the bead of the membrane between them, said projections being radially spaced from said bead when said membrane is not bulged, to permit said membrane to bulge outward without substantial stretching; and a nonrectilinear cut through the membrane between the opposite surfaces thereof delimiting at least one tongue from the membrane, the tongue being cut-contiguous with the membrane when the membrane is not bulged and projecting, from at least proximate the bead of the membrane, in the direction, between the opposite surfaces of the membrane, extending inwardly from its bead, wherein the opposite surfaces of said membrane within said peripheral integral bead are unobstructed so as to permit said membrane to bulge outward in the direction of at least one of said working and equalizing spaces.

2. The mount of claim 1, wherein the tongue has a length at least equal to the least thickness of the tongue in the direction between the opposite surfaces of the membrane extending inwardly from the bead of the membrane and not more than eight times the least thickness of the tongue.

3. The mount of claim 2, wherein the tongue has a length at least double the least thickness of the tongue and not more than five times the least thickness of the tongue.

4. The mount of claim 2, wherein the tongue projects centrally of the membrane.

5. The mount of claim 4, wherein the cut extends into the bead of the membrane.

6. The mount of claim 5, and further comprising at least one other of the cut, the cuts being uniformly distributed about the peripheral bead of the membrane.

7. The mount of claim 6, wherein pairs of the tongues delimited by the cuts are opposite each other across the membrane.

8. The mount of claim 6, wherein the projections of the mounting bracket are annular to define a channel therebetween for receiving the bead of the membrane and have beads on their inner sides facing the membrane.

9. The mount of claim 6, wherein the cross section of the cut is not perpendicular between the opposite surfaces of the membrane extending inwardly from its bead.

10. The mount of claim 6 wherein one of the membrane and tongue is thicker at the cut than the other in the direction between the opposite surfaces of the membrane extending inwardly from the bead of the membrane.

11. The mount of claim 1, wherein the tongue projects centrally of the membrane.

12. The mount of claim 1, wherein the cut extends into the bead of the membrane.

13. The mount of claim 1, and further comprising at least one other of the cut, the cuts being uniformly distributed about the peripheral bead of the membrane.

14. The mount of claim 1, wherein the projections of the mounting bracket are annular to define a channel therebetween for receiving the bead of the membrane and have beads on their inner sides facing the membrane.

15. The mount of claim 1, wherein the cross section of the cut is not perpendicular between the opposite surfaces of the membrane extending inwardly from its bead.

16. The mount of claim 15, wherein the cross section of the cut is curved.

17. The mount of claim 1, wherein one of the membrane and tongue is thicker at the cut than the other in the direction between the opposite surfaces of the membrane extending inwardly from the bead of the membrane.

* * * * *